United States Patent [19]

Takahashi

[11] Patent Number: 5,299,252
[45] Date of Patent: Mar. 29, 1994

[54] FLUORESCENT X-RAY FILM THICKNESS MEASURING APPARATUS

[75] Inventor: Masanori Takahashi, Tokyo, Japan

[73] Assignee: Seiko Instruments Inc., Tokyo, Japan

[21] Appl. No.: 44,363

[22] Filed: Apr. 7, 1993

[30] Foreign Application Priority Data
Apr. 7, 1992 [JP] Japan .............................. 4-021183[U]

[51] Int. Cl.$^5$ .............................................. G21K 1/02
[52] U.S. Cl. ...................... 378/50; 378/205; 378/44; 378/151
[58] Field of Search ............... 378/44, 50, 45, 53, 378/54, 84, 87, 62, 145, 147, 151, 159, 205, 206, 48; 250/505.1

[56] References Cited

U.S. PATENT DOCUMENTS 5,237,599  8/1993  Gunji et al. ........................ 378/145

*Primary Examiner*—David P. Porta
*Assistant Examiner*—Don Wong
*Attorney, Agent, or Firm*—Spensley Horn Jubas & Lubitz

[57] ABSTRACT

A fluorescent X-ray thin film measuring apparatus having a collimator with an aperture which forms a primary X-ray beam to have a long and narrow cross-sectional shape and which can be rotated about the axis of the X-ray beam, and a display device for observing a sample surface by superposing a pattern on the sample surface, the pattern showing the angular position of the collimator aperture which defines the angular position of the long and narrow cross-sectional shape of the primary X-ray beam.

2 Claims, 2 Drawing Sheets

FLUORESCENT X-RAY FILM THICKNESS MEASURING APPARATUS

BACKGROUND OF THE INVENTION

The present invention relates to a film thickness measuring apparatus utilizing fluorescent X-rays.

In order to measure the thickness of a minute area using fluorescent X-rays, collimators have been used as means for illuminating a minute area of an object with primary X-rays for excitation. Among various kinds of collimators, a suitable one is selected according to the size of the object to be measured. Collimators are made generally in a circular or rectangular form. However since a collimator with a small aperture cannot pass an X-ray beam of sufficient intensity, a rectangular collimator has been used in order to obtain higher X-ray intensity for an elongated measuring portion.

When a rectangular collimator is used for a measurement, a sample object is arranged so as to orient perfectly a long and narrow portion to be measured with the long dimension of the collimator aperture.

A prior art rectangular collimator can obtain stronger X-ray strength. However there has been a disadvantage in that the workability is very bad in actual measurement. For example, a sample must be arranged in such a manner that a longer side of its measuring portion is matched perfectly with the long side of the collimator aperture, or if a sample has measuring portions oriented in different longer directions, a procedure must be repeated to match rotatably the longer side of a measuring portion with the long side of the collimator aperture.

SUMMARY OF THE INVENTION

It is an object of the present invention to overcome the above conventionally inferior workability and to provide a fluorescent X-ray film thickness measuring apparatus which is capable of easily positioning a measuring portion with its longer direction having any orientation.

In order to solve the above problem, a fluorescent X-ray film thickness measuring apparatus according to the present invention can freely rotate a rectangular type primary X-ray collimator through 180° around the axis thereof and stop it at a desired angle, whereby its oriented direction can be confirmed by a sample observing device.

DESCRIPTION OF THE PREFERRED EMBODIMENTS

Figure 1:
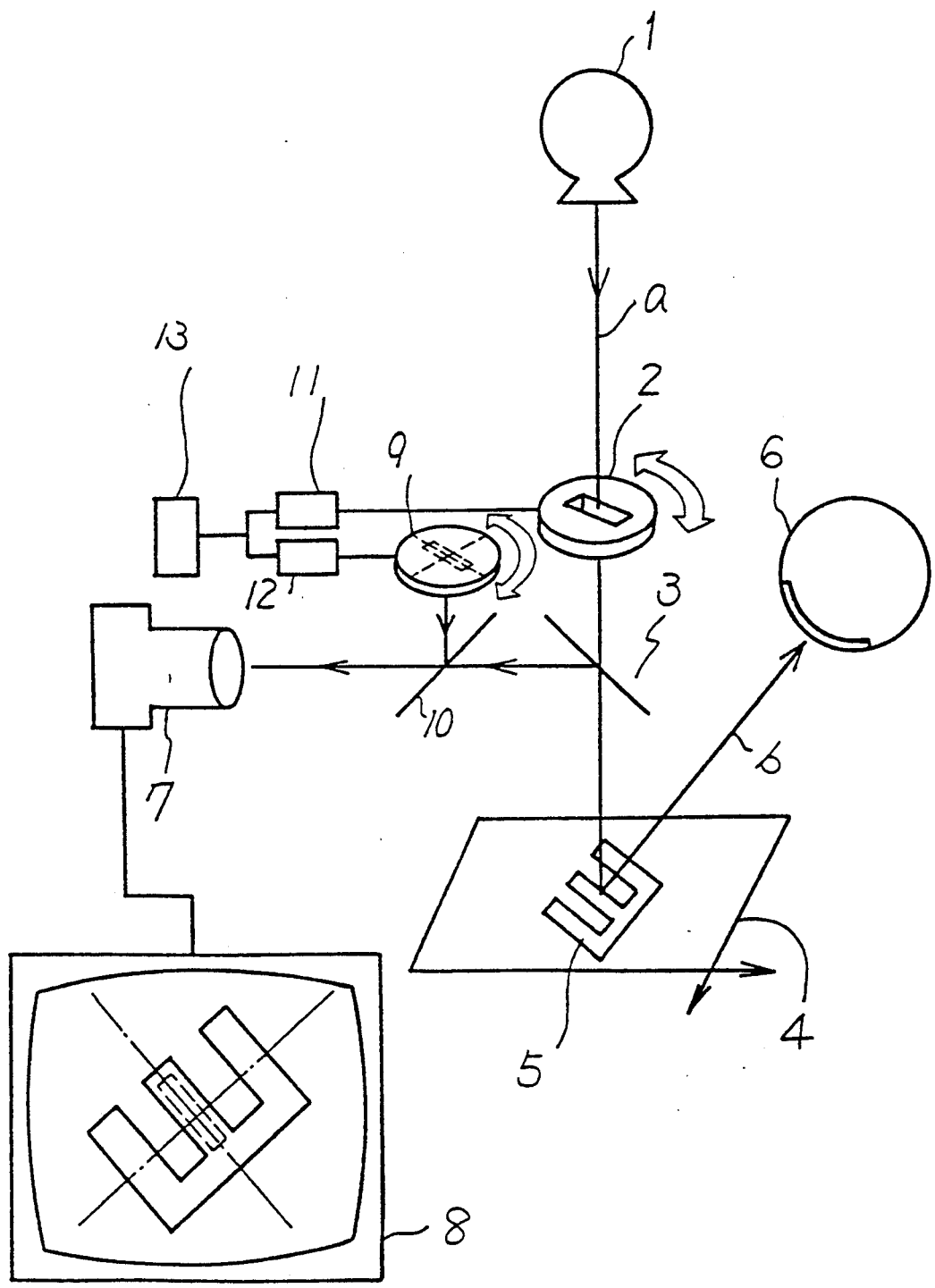
FIG. 1 is a perspective view showing a first embodiment or the fluorescent X-ray film thickness measuring apparatus according to the present invention.

An description of embodiment of a fluorescent X-ray film thickness measuring apparatus according to the present invention will be provided below with reference to the drawing.

Referring to FIG. 1, primary X-rays a generated by an X-ray tube 1 are collimated in the form of a beam by means of a collimator 2 having a rectangular opening, or aperture. The beam is directed through a sample observing mirror 3 to irradiate a sample 5 mounted on an automatic X-Y sample stage 4. An X-ray detector 6 detects fluorescent X-rays b emitted from sample 5 in response to excitation by the primary X-rays and the output thereof is processed by a succeeding signal processing system (not shown) and converted into a film thickness indication.

The shape of the sample 5 is monitored, through the mirror 3, with the aid of a television camera 7 and a cathode ray tube (CRT) 8, and is displayed on the CRT 8. At the same time, the image of a reticle 9 is superposed on the sample image through a half mirror, or semitransparent mirror, 10 and is displayed on the CRT 8. Cross lines showing the direction of the aperture of collimator 2 and an outline showing the shape of the aperture of collimator 2 are etched on the reticle 9.

Collimator 2 is mounted to be rotated about an axis which passes through the geometric center of the rectangular aperture and which is parallel to the axis of the collimated primary X-ray beam by means of a collimator drive motor 11. Similarly, a reticle drive motor 12 rotates reticle 9 about an axis perpendicular to the cross lines and passing through the point of intersection of the cross lines.

A motor controller 13 controls the collimator drive motor 11 and the reticle drive motor 12 so as to rotate them by the same angle. The optical system consisting of the mirror 3, the reticle 9, the half mirror 10, and the television camera 7 is adjusted so as to match the center position of the primary X-ray beam on the automatic X-Y sample stage 4 with the intersection of the cross lines of reticle 9 displayed on the CRT 8. Furthermore, the direction of the long dimension of the cross section of the primary X-ray beam, defined by the outline of the aperture in collimator 2, is matched with the direction, at that time, of the cross lines displayed on the CRT 8, by adjusting the angular orientation of the reticle 9 and the angular orientation of the collimator 2.

In the fluorescent X-ray film thickness measuring apparatus thus composed and adjusted, when the thickness of an elongated sample portion is measured, the automatic X-Y sample stage 4 carrying the sample 5 is moved to align the portion being measured thereof with the intersection of the cross lines.

Next after rotating the collimator 2 to align the collimator image or cross lines displayed on the CRT 8 with the desired direction of the portion being measured, a film thickness measurement may be started.

Figure 2:
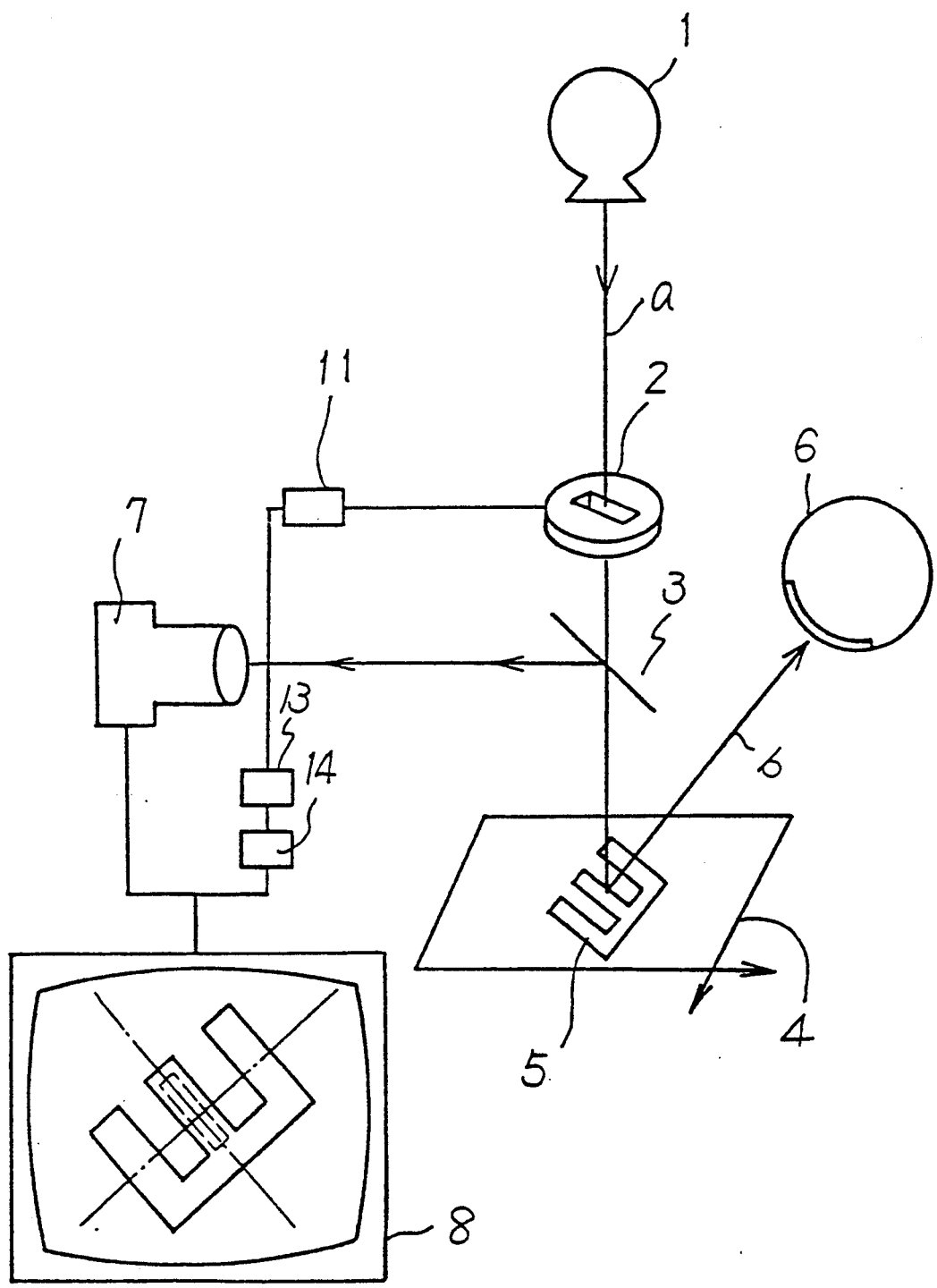
FIG. 2 is a perspective view showing another embodiment of the fluorescent X-ray film thickness measuring apparatus according to the present invention.

FIG. 2 shows an embodiment functionally similar to that of FIG. 1. In FIG. 2, a cross line generator 14 which electronically produces cross lines and a collimator aperture image is used to produce the desired display on CRT 8, instead of reticle 9, half mirror 10, and reticle drive motor 12 shown in FIG. 1.

The above fluorescent X-ray film thickness measuring apparatus includes a rectangular aperture collimator which can be stopped at an arbitrary angle within a range of 180° and around the center of the aperture. Furthermore since a sample observing device can confirm the angular orientation of the collimator, a positioning procedure can be easily achieved with respect to an elongated portion to be measured extending in an arbitrary direction on a sample.

As described above, according to the present invention, the rectangular collimator can rotate around the axis of a primary X-ray beam and stop at a desired position. Furthermore the direction of the long side of the rectangle can be confirmed using a sample observing device. Hence this structure can position the elongated measuring portion in a desired direction and has the effect of facilitating its orienting procedure.

This application relates to subject matter disclosed in Japanese application number U4-21183, filed on Apr. 7, 1992, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A fluorescent X-ray film thickness measuring apparatus for measuring a film thickness of a sample, said film thickness measuring apparatus comprising: a collimator having an aperture for forming a primary X-ray beam having a beam axis and a rectangular cross section; means connected to said collimator for rotating said collimator around the primary X-ray beam axis to a desired angular position; and means for monitoring a portion of the sample comprising means for overlapping a representation of the sample portion with a representation of the orientation of the rectangular cross section of the formed primary X-ray beam.

2. A fluorescent X-ray film thickness measuring apparatus comprising:

an X-ray tube for generating a primary X-ray;

a collimator having a rectangular aperture for forming the primary X-ray into a beam having a beam axis and a rectangular cross section, the rectangular aperture and the rectangular cross section each having a long dimension;

means for holding a sample at a measuring position for irradiation of a portion of the sample by the beam in order to cause fluorescent X-rays to be emitted from the sample portion, the sample portion having a long dimension;

an X-ray detector disposed for detecting the fluorescent X-rays;

a mirror for reflecting an image of the sample at the measuring position;

display means for displaying the image of the sample portion reflected by said mirror;

a collimator drive motor coupled to said collimator for rotating said collimator about the beam axis and for matching the orientation of the long dimension of the aperture with the orientation of the long dimension of the sample portion; and indicating means for indicating the orientation of the aperture and sending information indicating the orientation to said display means.

* * * * *